(12) United States Patent
Kempf et al.

(10) Patent No.: US 10,712,445 B2
(45) Date of Patent: Jul. 14, 2020

(54) METHOD FOR DETECTING AT LEAST ONE PARKING SPACE FOR A VEHICLE (71) Applicant: Robert Bosch GmbH, Stuttgart (DE)

(72) Inventors: Markus Kempf, Munich (DE); Philipp Mayer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/304,972

(22) PCT Filed: Apr. 10, 2017

(86) PCT No.: PCT/EP2017/058545
§ 371 (c)(1),
(2) Date: Nov. 27, 2018

(87) PCT Pub. No.: WO2017/207151
PCT Pub. Date: Dec. 7, 2017

(65) Prior Publication Data
US 2019/0162850 A1  May 30, 2019

(30) Foreign Application Priority Data

Jun. 3, 2016 (DE) .......... 10 2016 209 810

(51) Int. Cl.
*G01S 15/931* (2020.01)
*G01S 13/931* (2020.01)
(Continued)

(52) U.S. Cl.
CPC .......... *G01S 15/931* (2013.01); *G01S 13/931* (2013.01); *G08G 1/04* (2013.01);
(Continued)

(58) Field of Classification Search
CPC .................................. G01S 1/00; G08G 1/00
See application file for complete search history.

(56) References Cited

U.S. PATENT DOCUMENTS

2012/0062396 A1* 3/2012 Inoue .................... G01S 15/931
340/932.2

FOREIGN PATENT DOCUMENTS

DE  102004062021 A1  7/2006
DE  102007039348 A1 * 2/2009 ........... G01S 15/931
(Continued)

OTHER PUBLICATIONS

English translation of 102010025552.*
(Continued)

*Primary Examiner* — Shirley Lu
(74) *Attorney, Agent, or Firm* — Norton Rose Fulbright US LLP; Gerard Messina (57) ABSTRACT

Objects are sensed by a distance sensor of a vehicle. Reflected signals are received as echo signals by the driving-environment sensor. Object distance is calculable, for example, from the propagation time of the signals. Of the sensed objects, those objects are identified which, e.g., based on their spatial disposition, are parking-space-delimiting objects. It is possible to differentiate between objects delimiting a parking space to the side (e.g., parked vehicles) and lateral parking-space delimitations (e.g., a curbstone) by evaluating the echo signals. The parking-space-delimiting objects are classified through characteristic structures of the echo signals assigned to the parking-space-delimiting objects, and an object class is assigned to each parking-space-delimiting object. A parking-space quality is determined as a function of the classification, and a parking space defined by the parking-space-delimiting objects is recognized as a possible parking space if the quality of the parking space meets a threshold.

9 Claims, 6 Drawing Sheets

(51) Int. Cl.
*G08G 1/04* (2006.01)
*G08G 1/14* (2006.01)

(52) U.S. Cl.
CPC ............... *G01S 2013/9314* (2013.01); *G01S 2013/9323* (2020.01); *G01S 2013/9324* (2020.01); *G01S 2013/93271* (2020.01); *G01S 2013/93272* (2020.01); *G01S 2013/93274* (2020.01); *G01S 2015/934* (2013.01); *G01S 2015/935* (2013.01); *G01S 2015/936* (2013.01); *G01S 2015/937* (2013.01); *G08G 1/14* (2013.01)

(56) References Cited

FOREIGN PATENT DOCUMENTS

| | | | |
|---|---|---|---|
| DE | 102007039348 A1 | 2/2009 | |
| DE | 102008028550 A1 * | 12/2009 | ............. G08G 1/147 |
| DE | 102008028550 A1 | 12/2009 | |
| DE | 102009028024 A1 | 2/2011 | |
| DE | 102010025552 A1 * | 12/2011 | ............. G08G 1/168 |
| DE | 102010025552 A1 | 12/2011 | |
| DE | 112009005165 T5 | 9/2012 | |
| DE | 102011113916 A1 | 3/2013 | |
| DE | 102013018721 A1 | 6/2014 | |
| DE | 102014009627 A1 * | 11/2014 | ....... G08G 1/096741 |
| DE | 102014009627 A1 | 11/2014 | |
| DE | 102014209072 A1 | 11/2014 | |
| DE | 102014215858 A1 | 2/2016 | |

OTHER PUBLICATIONS

English translation of 102007039348.*
English translation of 102008028550.*
English translation of 102014009627.*
International Search Report dated Jul. 3, 2017 of the corresponding International Application PCT/EP2017/058545 filed Apr. 10, 2017.

* cited by examiner

METHOD FOR DETECTING AT LEAST ONE PARKING SPACE FOR A VEHICLE

CROSS-REFERENCE TO RELATED APPLICATIONS

The present application is the national stage of International Pat. App. No. PCT/EP2017/058545 filed Apr. 10, 2017, and claims priority under 35 U.S.C. § 119 to DE 10 2016 209 810.1, filed in the Federal Republic of Germany on Jun. 3, 2016, the content of each of which are incorporated herein by reference in their entireties.

FIELD OF THE INVENTION

The present invention relates to a method for detecting at least one parking space for a vehicle, as well as a corresponding driver assistance system.

BACKGROUND

Driver assistance functions based on ultrasonic sensors are sufficiently familiar from the related art. Parking spaces are identified using ultrasonic sensors and offered to the driver as parking possibility. A semi-automated or fully automated parking assistance system aids the driver when pulling into the free parking space thus identified. It is likewise known to transmit the positions and dimensions of detected parking spaces to a data server. See, for example, DE 10 2004 062 021 A1, DE 10 2009 028 024 A1, and DE 10 2008 028 550.

In the case of existing systems, the false detection rate for detecting parking spaces is relatively high. Thus, parking spaces can be detected as the result of reflections off of trees or walls, for example, without a real parking space being present physically.

DE 10 2013 018 721 A1 describes a method for detecting at least one parking space using a sensor that sends out a primary signal and receives an echo signal. Objects are classified using the method, differentiation being made between vehicle and non-vehicle, for example. The recognition of curbstones, trees, trash cans, and the like is also possible. Likewise, it is possible to differentiate between stationary and non-stationary objects. In addition, it is provided to determine the orientation of the recognized objects. Parking spaces with high probability are located between two objects classified as vehicle, with sufficient distance between the two objects. using an object recognized as automobile whose orientation was determined, the alignment of the parking space can also be identified.

DE 10 2011 113 916 A1 relates to a method to classify parking scenarios for a parking system. In that case, objects delimiting a parking space, depth of the parking space, width of the parking space, and further parameters are used. The parking scenarios are assessed by evaluating the individual criteria of each parking scenario, the individual evaluations of each classification of each parking scenario being combined. In this context, the assessment or classification can be carried out on the basis of an assignment of probabilities or by a distribution of point values.

DE 10 2014 009 627 A1 describes a method for reporting a free parking space for a vehicle. In that case, free parking spaces are detected using in-vehicle sensors and provided with attributes such as length, width, height, angle, type, and geographic position. In addition, a link to a digital roadmap is also possible, in order to rule out the use of areas that are too close to an intersection, for example. The parking spaces detected are filtered on the basis of the ascertained information. Relevant parking spaces are reported to other vehicles, either a direct communication between two vehicles or a central data server being used for that purpose.

SUMMARY

According to an example embodiment of the present invention, a method detects a parking space for a vehicle, especially a motor vehicle. The method includes, first of all, sensing objects in the environment of the vehicle by at least one distance sensor of the vehicle. The vehicle has driving-environment sensors in order to sense possible parking spaces in the surrounding area. Suitable driving-environment sensors include radar-, lidar-, or ultrasonic sensors. For example, if the driving-environment sensors take the form of distance sensors, especially distance sensors based on ultrasound, then possible parking spaces are detected by a vehicle, in that typically at least one of the distance sensors is mounted on the vehicle so that it is oriented to the side, and the vehicle passes by the possible parking spaces. Preferably, the driving-environment sensors of the vehicles are implemented as distance sensors, possible parking spaces being sensed while driving past them. To that end, the driving-environment sensor sends out signals which are reflected by objects in the area surrounding the vehicle. The reflected signals are received as echo signals by the driving-environment sensor. For example, an object distance can be calculated in known manner from the propagation time of the signals. The objects in the area surrounding the vehicle can be detected while the vehicle is driving past the objects, for instance.

Of the detected objects, those objects are identified which, e.g., based on their spatial disposition, are parking-space-delimiting objects. In this context, it is possible to differentiate between objects that delimit the parking space to the side (e.g., parked vehicles) and lateral parking-space delimitations (e.g., a curbstone). The identification is accomplished by evaluating the acquired echo signals.

In the next step, the parking-space-delimiting objects are classified through characteristic structures of the echo signals assigned to the parking-space-delimiting objects. In so doing, a specific object class is assigned to each parking-space-delimiting object.

Thereupon, a parking-space quality is determined as a function of the classification of the parking-space-delimiting objects, a parking space defined by the parking-space-delimiting objects being recognized as a possible parking space for the vehicle if the quality of the parking space corresponds to a predetermined limiting value or exceeds the predetermined limiting value.

The present invention thus proposes a method by which parking spaces can be detected with high accuracy and a quality of the parking space is able to be determined. The invention permits the calculation of a parking-space quality of parking spaces detected especially using ultrasonic sensors. Preferably, the parking-space quality thus determined can be broken up into various levels, e.g., "very low," "low," "medium," "high," and "very high." False detections are able to be filtered via the parking-space quality measure. For example, this can be carried out directly in a control unit of the vehicle, and additionally or alternatively on a data server, thus, a computer provided outside of the vehicle, which is able to receive data from the vehicle and transmit data to the vehicle. In this case, for example, the parameters necessary for calculating the parking-space quality can be transmitted to the data server. In particular, a multi-level parking-space quality measure makes it possible to adjust the sensitivity of the filtering, because a threshold value for the quality of the parking space is freely selectable. In other words, a working point is able to be defined depending on the specific application case. For instance, in the case of a setting with "low" sensitivity, only parking spaces which have a quality of "very low" can be filtered out as unsuitable. For a setting of "high" sensitivity, parking spaces with a parking-space quality of "very low," "low," and "medium" are filtered out as unsuitable. The working point, i.e., the threshold value, can be selected by the driver of the vehicle according to the user's preference, for example, or can be preselected based on empirical values and/or instantaneous conditions. For instance, the threshold value can be predetermined as a function of the type of vehicle.

To ascertain a possible parking space, a plurality of parameters are determined via the driving-environment sensors of the vehicles. In particular, these parameters include reference objects which bound the possible parking space. In the case of parking spaces which border on a street, in relation to the direction of traffic through the street, there is a first parking-space-delimiting object, which delimits the possible parking space to the back, a second parking-space-delimiting object, which delimits the possible parking space to the front, and a lateral parking-space delimitation, which delimits the parking space toward the side facing away from the middle of the street. For instance, the first and second parking-space-delimiting objects are parked vehicles, and the lateral reference is a curbstone, for example.

In addition, the position of a possible parking space can be determined using a position ascertained by the driving-environment sensors relative to the vehicle and a vehicle position ascertained by the use of satellite-based navigation. In this case, using the driving-environment sensors of the vehicle, the position of a possible parking space is first of all determined relative to this vehicle's own position. In turn, the vehicle's own position can be determined utilizing satellite-based navigation, so that an absolute position indication is assigned to a possible parking space.

According to example embodiments of the present invention, the parking-space-delimiting objects are classified based on an evaluation of the echo signals reflected back from the respective object, utilizing characteristic structures of these echo signals. In an example embodiment, the characteristic structures of the echo signals include hyperbolic structures obtained by plotting the sensor position at the measuring instant in relation to an object distance determined from the propagation time of the echo signal. Such hyperbolic structures develop to an exceptionally marked degree if the sensed parking-space-delimiting object is an angular, especially an essentially cuboidal object. The characteristic hyperbolic structures develop because, owing to the reception of the echo signal at a specific sensor position, it is true that by ascertaining the signal propagation time, the distance to the parking-space-delimiting object can be determined, but not the direction in which the parking-space-delimiting object is located relative to the sensor position. Therefore, upon approach of the sensor to the object, the distance to the corner of the cuboid nearest to the sensor is represented as a hyperbola. In order to be able to detect such hyperbolic structures at all, a sufficiently strong echo signal should be present. In the case of objects with sharp edges and corners, only a very small portion of the incident signal is reflected back as echo signal to the sensor, which can prevent determination of the hyperbolic structure in the measuring data. However, if, for example, the object is a parked vehicle which has rounded edges and corners, a sufficient portion of the incident signal is then reflected back as echo signal to the sensor, and hyperbolic structures are able to be recognized in the measuring data. If such hyperbolic structures are recognized in the measuring data, it can thus be deduced from this that the parking-space-delimiting object is an object with rounded corners. As a rule, it would be a parked vehicle. If no hyperbolic structures are recognized, it can then be concluded that the parking-space-delimiting object is not a parked vehicle. In addition, the detected length of the object can be included in the classification.

A parking space is defined preferably by a first parking-space-delimiting object, a second parking-space-delimiting object, and a lateral parking-space delimitation. A classification can be undertaken whereby, for example, for the first and second parking-space-delimiting objects, classification into object classes such as "no object present," "vehicle parked transversely to the direction of traffic," "vehicle parked parallel to the direction of traffic," and "unknown" can be implemented. In the case of the lateral parking-space delimitation, for example, a classification into the object classes "no lateral parking-space delimitation present," "low lateral parking-space delimitation," "high lateral parking-space delimitation", and "unknown" can be implemented. For instance, a "low lateral parking-space delimitation" can be a curbstone, a "high lateral parking-space delimitation" can be a wall, for example. Preferably, the classification is accomplished by determining the length in relation to the direction of traffic of the parking-space-delimiting objects, and the determination of the number of measuring points that can be assigned to a hyperbolic structure.

Moreover, by additional evaluation of the positions and sizes, especially the length in relation to the direction of traffic of the parking-space-delimiting objects, it is possible to estimate the position, orientation, and size of the possible parking space. For example, from the length and width of the possible parking space, it can be deduced whether the possible parking space is a parallel parking space or a longitudinal transverse parking space. In the case of parallel parking spaces, the vehicle is parked parallel to the direction of traffic, and in the case of transverse parking spaces, transversely to the direction of traffic. For instance, if it is determined that the width of a possible parking space, thus, the measurement of the parking space transversely to the direction of traffic, is less than the vehicle length, then a parallel parking space is inferred. On the other hand, if the width of a possible parking space is greater than the vehicle length, this suggests the presence of a transverse parking space.

In an example embodiment, based on the classification of the parking-space-delimiting objects thus carried out, a measure of quality is determined that represents the parking-space quality. In so doing, in particular, a quality measure is assigned to every possible combination of object classes of the first parking-space-delimiting object, the second parking-space-delimiting object, and the lateral parking-space delimitation. For instance, a high quality measure stands for a high parking-space quality, thus, a parking space which, with high probability, represents an actually existing parking possibility, and is not caused by a false detection, e.g., of oncoming traffic.

The present invention thus offers an advantage that fewer false detections with respect to parking are offered to the driver. In addition, the quality of a parking-space map, which is created on the basis of the parking spaces detected and evaluated according to the invention, is able to be improved because of the reduced number of false detections.

DETAILED DESCRIPTION

In the following description of exemplary embodiments of the invention, identical elements are denoted by identical reference numerals, a repeated description of these elements possibly being omitted. The figures represent the subject matter of the invention only schematically.

Figure 1:
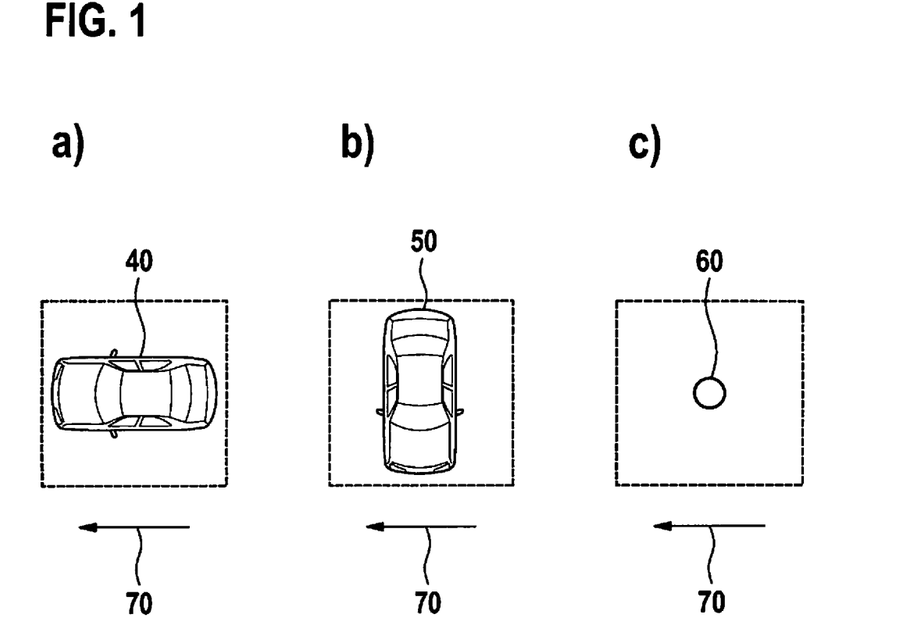
FIG. 1 shows schematically different object classes for parking-space-delimiting objects according to an example embodiment of the present invention.

In FIG. 1, various object classes for parking-space-delimiting objects are portrayed with examples. Thus, part (a) shows a vehicle 40 parked parallel to direction of traffic 70, according to a first object class "parallel-parked vehicle." Part (b) shows a vehicle 50 parked transversely to direction of traffic 70, according to a second object class "transversely parked vehicle." Part (c) shows an object 60 having an approximately round cross-section in top view, e.g., a post or a lamp post, according to a third object class "short object." In addition, a fourth object class "no object" can also be provided. In an example embodiment of the invention, those objects which delimit the parking space in the direction of traffic are classified in one of the indicated object classes.

According to an example embodiment of the present invention, the classification is selected by evaluating characteristic structures of the echo signals acquired by a driving-environment sensor such as an ultrasonic sensor, for example, while the vehicle looking for a parking space is passing by. The echo signals can develop in known manner, in that signals sent out by an ultrasonic sensor are reflected by the parking-space-delimiting object and the resulting echo signals are received again by the sensor. As FIG. 2a shows, the geometry of the parking-space-delimiting object plays a large role with respect to the sensor positions at which echo signals are able to be received.

Figure 2A:
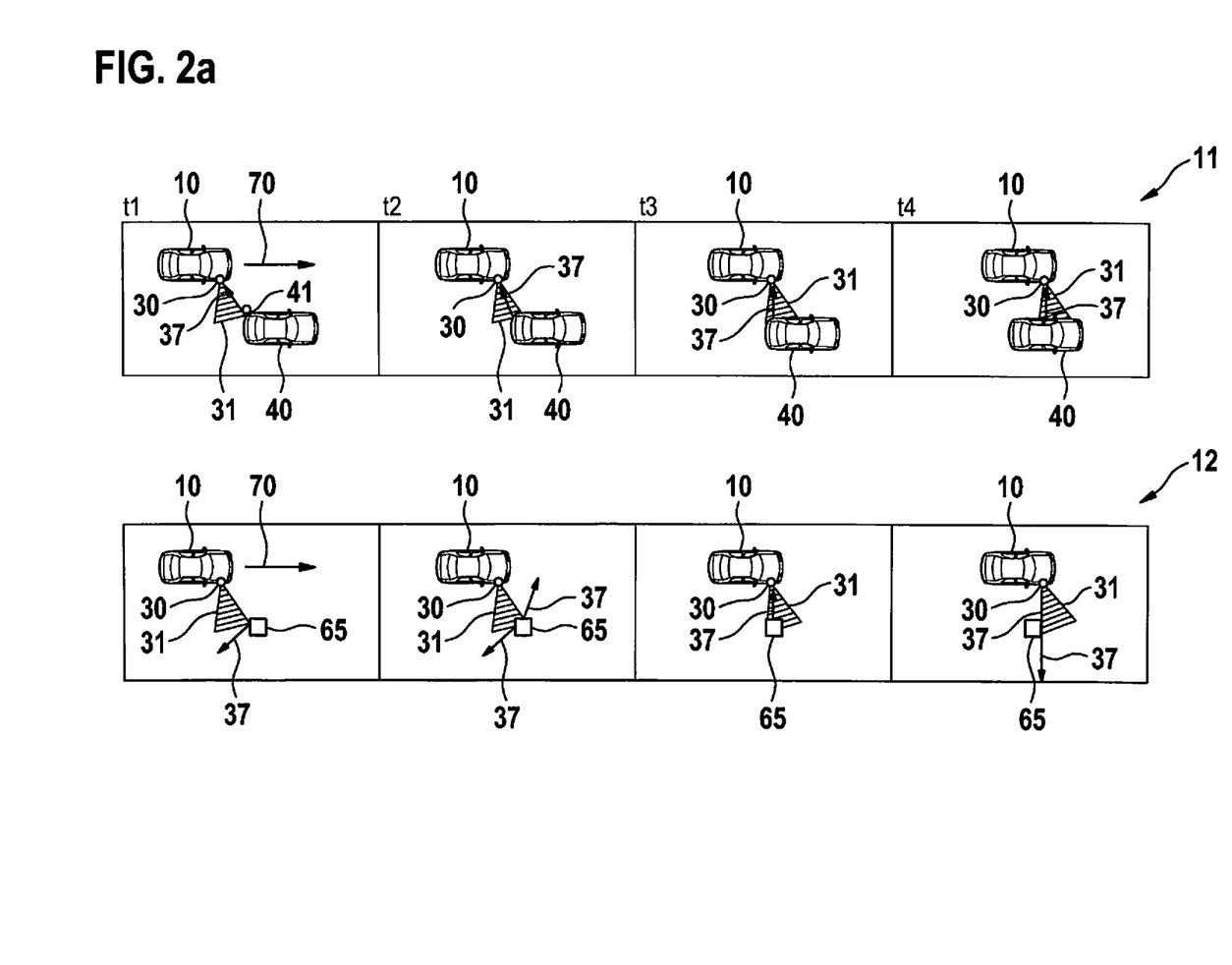
FIG. 2a schematically shows various sound reflections from a vehicle and from a short, angular object (box), which leads to the development of hyperbolic structures in the case of the sound reflection from the vehicle, according to an example embodiment of the present invention.

In the upper part of FIG. 2a, a vehicle 10 looking for a parking space is moving past a vehicle 40 parked parallel to direction of traffic 70. Vehicle 10 has an ultrasonic sensor 30 mounted laterally at the front of vehicle 10. Ultrasonic sensor 30 has a usually lobar directional characteristic 31. Directional characteristic 31 describes the spatial area in which ultrasonic waves are able to be emitted and received by ultrasonic sensor 30. Preferably, it can extend to the side of vehicle 10.

At instant t1, vehicle 10 is still markedly upstream of parked vehicle 40. As indicated by arrow 37, at this position of sensor 30, echo signals can already be received from the area of left rear corner 41 of vehicle 40, since the incident ultrasonic signals are able to be reflected back by the rounded form of the area of left rear corner 41 to sensor 30. At instant t2, vehicle 10 is drawing up to parallel-parked vehicle 40. However, the echo signals are still received mainly from the area of left rear corner 41 of vehicle 40. At instants t3 and t4, vehicle 10, or more precisely, sensor 30, is at a level with vehicle 40, and echo signals 37 are now produced by the lateral contour of vehicle 40 (so-called contour echoes). If the distance between vehicle 40 and the position of sensor 30, calculated by evaluating the echo signals, is plotted against the sensor position, a characteristic hyperbolic structure results for instants t1 and t2, as shown in detail in FIG. 2b. At instants t3 and t4, the contour of vehicle 40 is gauged, from which the length of vehicle 40 can be determined, for example.

In the lower part of FIG. 2a, a vehicle 10 looking for a parking space is moving past a short block-shaped object 65, e.g., a box. So long as vehicle 10, or rather ultrasonic sensor 30, is not at a level with object 65, because of the flat lateral surfaces and sharp corners and edges of object 65, only a small portion of the transmitted ultrasonic waves is reflected back to sensor 30, as indicated by arrows 37, which represent the main direction of reflection of the incident ultrasonic waves. Thus, at the positions corresponding to instants t1 and t2, ultrasonic sensor 30 should receive no or only very few echo signals. At instant t3, vehicle 10, or more precisely, sensor 30 is at a level with object 65, and echo signals 37 are now reflected directly to ultrasonic sensor 30. If the distance between object 65 and the position of sensor 30, calculated by evaluating the echo signals, is plotted against the sensor position, in this case no characteristic hyperbolic structure should result.

Although hyperbolic structures can also develop in the case of a round short object (e.g., a pipe or lamp post), because of the lack of or too small a quantity of contour echoes, they are able to be differentiated from a vehicle.

Figure 2B:
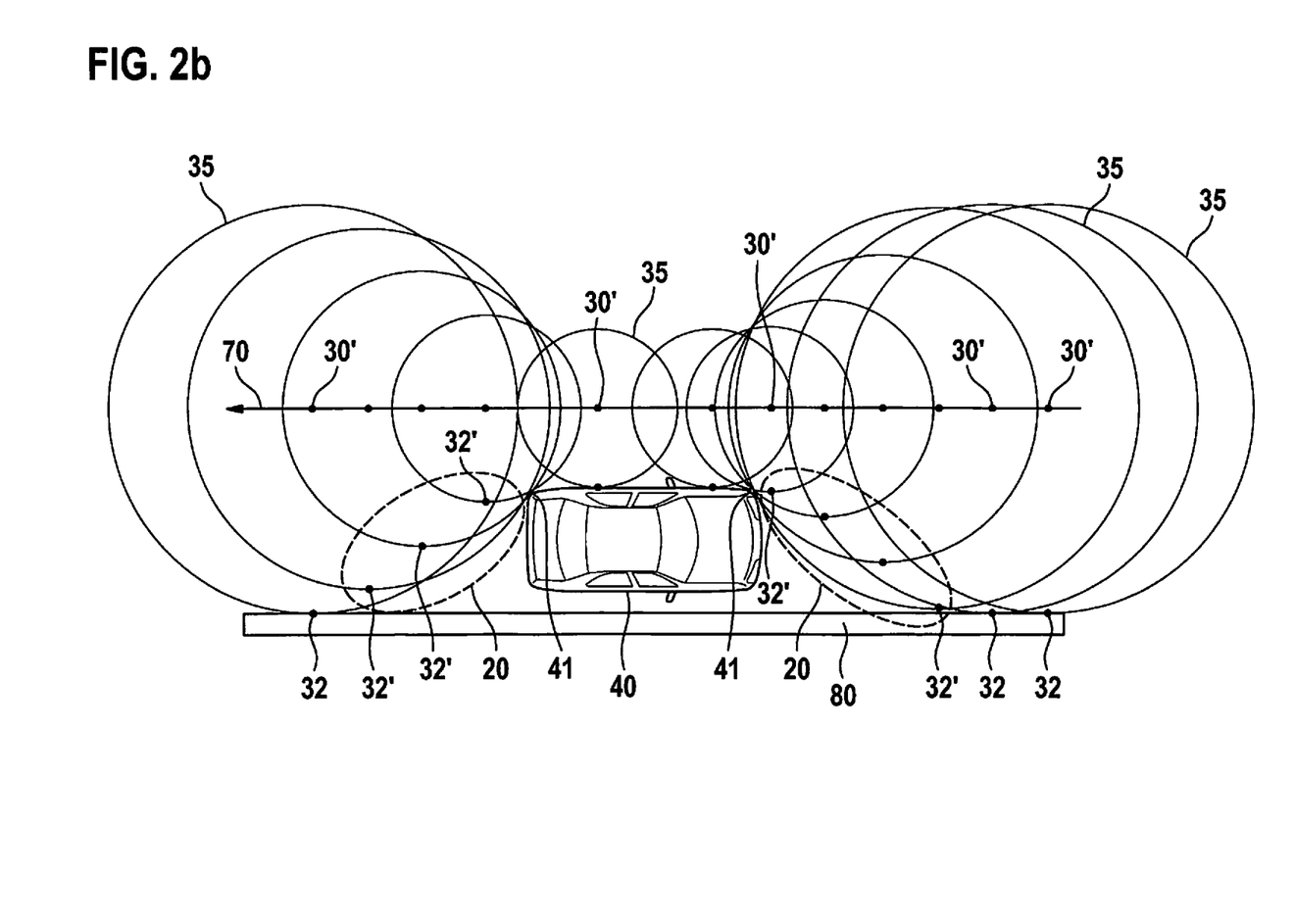
FIG. 2b schematically shows an acquisition of echo signals when driving past a parallel-parked vehicle and the development of characteristic hyperbolic structures according to an example embodiment of the present invention.

FIG. 2b illustrates in detail how characteristic hyperbolic structures are able to be recognized in the acquired data. The situation shown in FIG. 2b corresponds essentially to the situation shown above in FIG. 2a, where a vehicle (not shown) looking for a parking space is moving along a direction of traffic 70 past a vehicle 40 parked parallel to direction of traffic 70. At regular time intervals, an ultrasonic signal is sent out at a sensor position 30' and an echo signal is received. Assuming environmental conditions are known, the distance between the sensor position and the object from which the echo signal was reflected back can be calculated from the propagation time of the echo signal. In the illustration in FIG. 2b, the distances thus calculated are represented as circles 35, whose respective center points are associated sensor position 30'. The perpendicular projection of sensor position 30' onto associated circle 35 yields measuring point 32. If the measuring point coincides with the actual point from which the echo signal was reflected back, then measuring point 32 represents what is referred to as a contour echo. However, if the echo signal comes from rounded corner areas 41 of vehicle 40, then characteristic measuring points 32' result, which form a hyperbolic structure 20.

Figure 3:
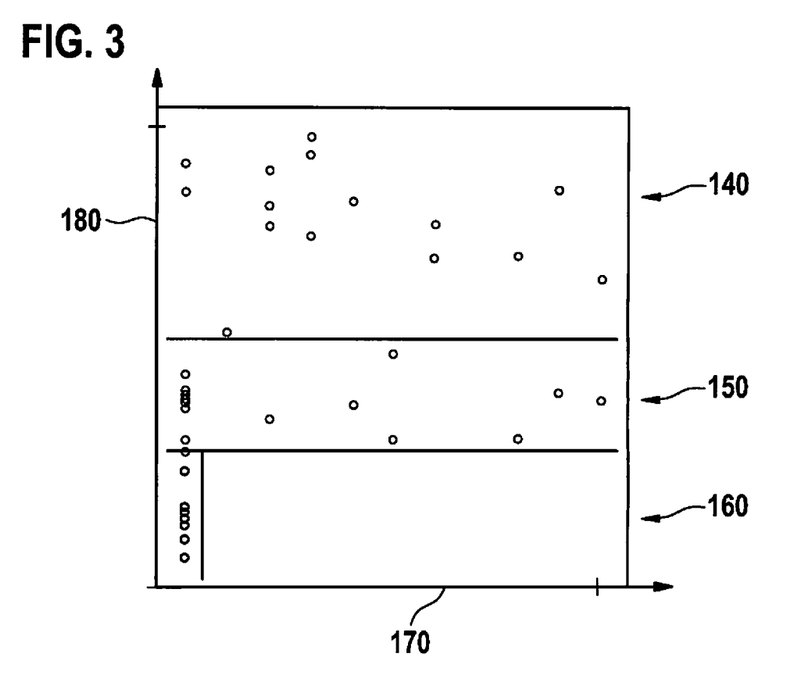
FIG. 3 is a diagram in which a number of detected hyperbolic structures is plotted against the detected object length for the three object classes of FIG. 1, according to an example embodiment of the present invention.

FIG. 3 shows how the parking-space-delimiting objects are able to be classified through characteristic structures of the echo signals. In the diagram shown, the measured lengths of various detected parking-space-delimiting objects are plotted on y-axis 180 against the number of determined hyperbolic points 32' (compare FIG. 2b) on x-axis 170. Essentially three regions 140, 150, 160 are obtained. Region 140, which is characterized by a length of more than, e.g., 2.13 meters and a wide scattering of hyperbolic echoes, is assigned to a vehicle 40 parked parallel to the direction of traffic, according to the first object class "parallel-parked vehicle." Region 150, which is characterized by a length of, e.g., between 2.13 and 1.37 meters and a wide scattering of hyperbolic echoes, is assigned to a vehicle 50 parked transversely to the direction of traffic, according to the second object class "transversely parked vehicle." Region 160, which is characterized by a length of, e.g., less than 1.37 meters and a small number of hyperbolic echoes, is assigned to a short object 60, 65, according to a third object class "short object."

According to an example embodiment of the present invention, a specific parking-space quality is assigned to the parking space as a function of the classification and/or the combination of object classes of the parking-space-delimiting objects. The parking-space quality is a quality measure that describes how well-suited the parking space is for the vehicle, expressed by a number between 0 and 1, for example. A parking space defined by the parking-space-delimiting objects is recognized as a possible parking space for the vehicle if the quality of the parking space corresponds to a predetermined limiting value or exceeds the predetermined limiting value.

Over and above the object classification, the quality of a parking space is substantially a function of the type of objects which delimit the parking space. In addition, the curbstone information is an important factor. Such a scene is shown by way of example in FIG. 4. In the situation shown, a parking space 200 is detected which is defined by parking-space-delimiting objects 220, 240, 260.

Figure 4:
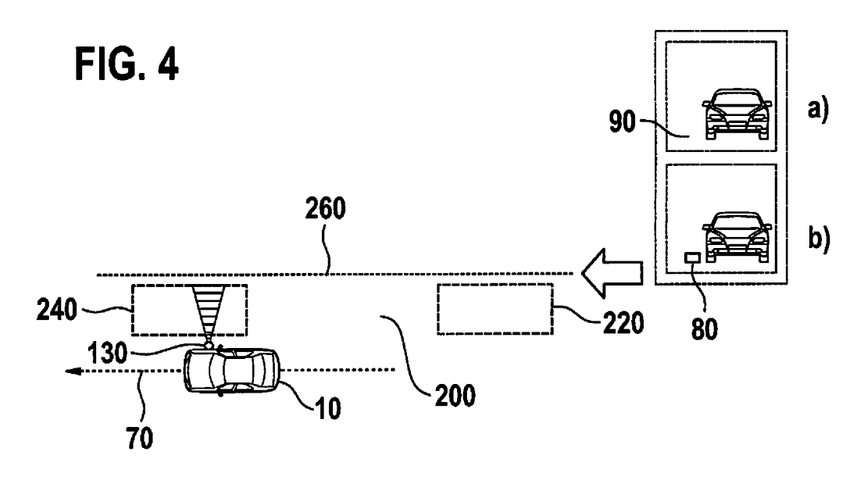
FIG. 4 schematically shows the sensing of parking-space-delimiting objects and lateral parking-space delimitations according to an example embodiment of the present invention.

Object 260 delimits the parking space laterally. For example, it can be a curbstone 80, or there can be no lateral boundary present 90. Based on the position of an object 260 between two objects 220, 240 potentially delimiting the parking space, it is assumed that it is an object delimiting the parking space laterally. Object 260 can be considered again in light of what are termed second echoes. To recognize "normal" parking-space-delimiting objects 220, 240, only the so-called first echoes (first echo signal received from the object) are used, for example. If the object distances determined by the respective first and second echoes are very close together, it can be assumed that object 260 is an object that is higher than the sensor installation position, e.g., a wall or pony wall, according to the object class "high lateral parking-space delimitation." If only a few or no second echoes are measured in the vicinity of the first echo, it can be assumed that object 260 is an object which is lower than the installation position of the sensor, e.g., a curbstone, according to the object class "low lateral parking-space delimitation." A ratio value of the number of first echoes to the number of valid second echoes can be calculated, for example. The closer the ratio value lies to 100%, the more certain the object is a high object.

One possibility for determining the overall quality measure of parking space 200 is to predetermine a specific quality measure for each combination of possible object classes for parking-space-delimiting objects 220, 240, 260. Overall, a large number of parking scenes can thus be differentiated. In this context, a scene is made up of three elements: (1) first parking-space-delimiting object 220, which is the first delimiting object of a parking space vehicle 10 passes, (2) second parking-space-delimiting object 240, which is the second delimiting object of a parking space that the ego vehicle passes, and (3) lateral parking-space delimitation 260, such as a curbstone 80, for instance.

In this context, as described above, the first and second objects can be classified as follows: (a) parallel-parked vehicle 40, (b) transversely parked vehicle 50, (c) short object 60, 65, or (d) no object. In addition, lateral parking-space delimitation 60 can be classified as follows: (a) no lateral delimitation present or (b) low lateral delimitation.

For example, 30 combinations are thus possible altogether.

The highest parking-space quality of 1 can now be assigned, for instance, to the following combination: (a) first object: parallel-parked vehicle; (b) lateral parking-space delimitation: low lateral delimitation; and (c) second object: parallel-parked vehicle.

For example, the lowest parking-space quality of 0 can be assigned to the following combination: (a) first object: short object; (b) lateral parking-space delimitation: no lateral delimitation present; and (c) second object: no object.

Between these two extreme cases, there can be various gradations of the parking-space quality as a function of the specific combination of classifications, which are represented by numbers between 0 and 1. The assignment of the combination of the classifications to a specific parking-space quality can be stored in the form of a table or a program map in the memory of a control unit of the vehicle, for example.

The multilevel parking-space quality measure thus obtained makes it possible to set the sensitivity of the filtering via a freely selectable working point depending on the specific application case.

Figure 5:
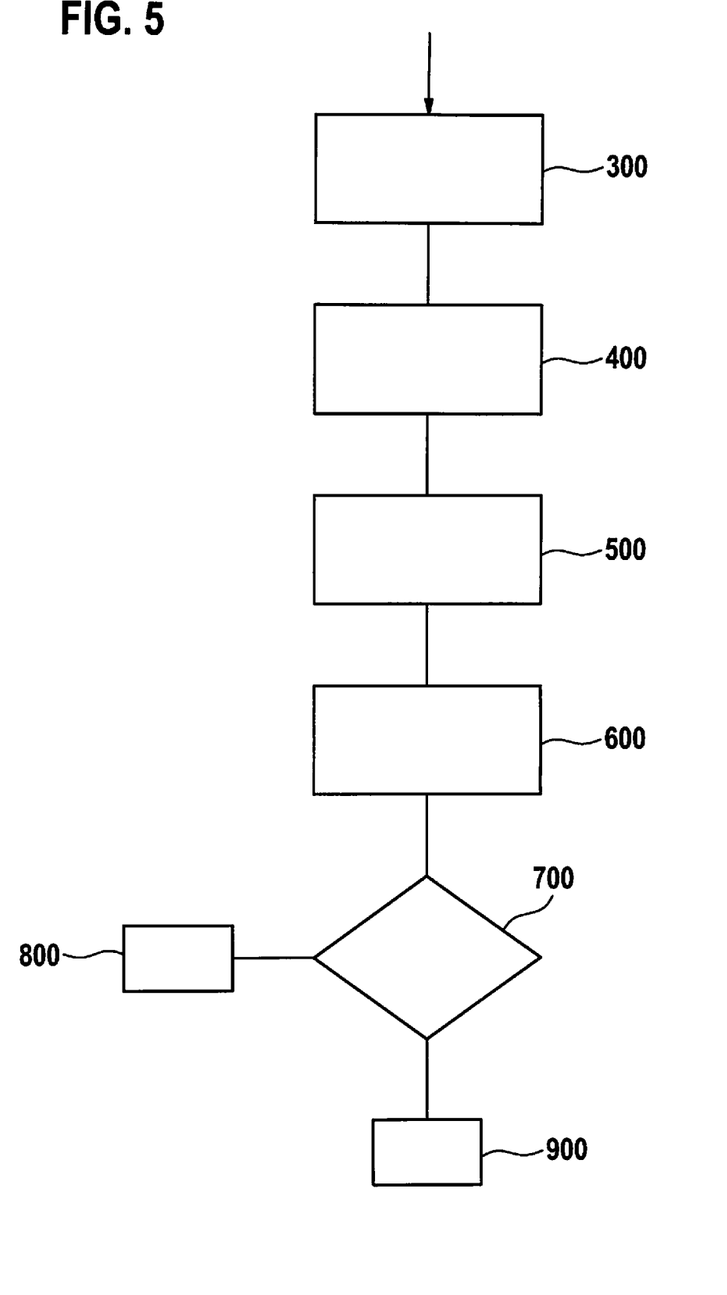
FIG. 5 is a flowchart of a method according to an example embodiment of the present invention.

FIG. 5 shows, as a flowchart, a sequence of an exemplary embodiment of a method according to the present invention. First of all, the method is activated, e.g., by an input on the part of the driver or by recognition of a situation. In step 300, objects in the environment of the vehicle are sensed using at least one driving-environment sensor of the vehicle, the driving-environment sensor sending out signals, particularly ultrasonic signals, the signals being reflected by objects in the environment of the vehicle, and the reflected signals being received as echo signals by the distance sensor.

In step 400, parking-space-delimiting objects are identified by evaluating the acquired echo signals. In step 500, the previously identified parking-space-delimiting objects are classified through characteristic structures of the acquired echo signals. In step 600, a parking-space quality is determined as a function of the classification of the parking-space-delimiting objects.

In step 700, it is checked whether the parking space defined by the parking-space-delimiting objects is a possible parking space for the vehicle. To that end, the quality of the parking space is compared to a predetermined limiting value. If the quality of the parking space corresponds to the predetermined limiting value or if the quality of the parking space exceeds the predetermined limiting value, then in step 800, the parking space is recognized as a possible parking space and is output to the driver, for example, and/or communicated to a data server.

If the quality of the parking space does not correspond to the predetermined limiting value, then in step 900, the parking space is discarded as a possible parking space.

Figure 6:
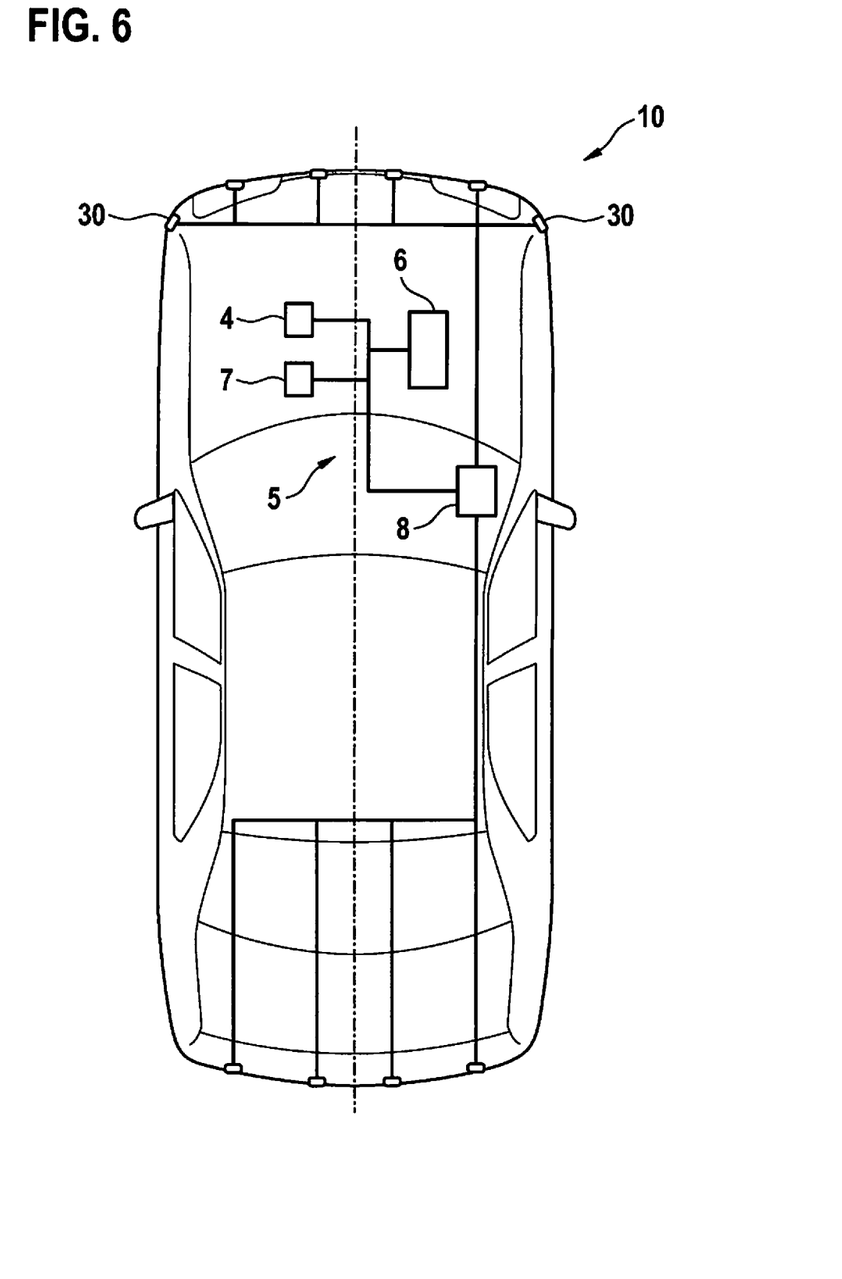
FIG. 6 shows a top view of a vehicle having a parking-assist system according to an example embodiment of the present invention.

FIG. 6 shows a vehicle 10 that has a parking-assist system 5 that is designed to carry out a method according to an example embodiment of the present invention. The parking-assist system includes two driving-environment sensors 30 in the form of ultrasonic sensors, an evaluation unit 8, a classification unit 7, and an output unit 6. The evaluation unit 8 evaluates the echo signals acquired using ultrasonic sensors 30. Based on this evaluation, classification unit 7 classifies parking-space-delimiting objects and assesses the detected parking space based on the classification. For example, evaluation unit 8 and classification unit 7 can be provided as separate components or can be realized as software modules in a control unit.

If the parking space is recognized as a possible parking space, this information is output on output unit 6 for the driver of vehicle 10. As an option, parking-assist system 5 can additionally include a transmission unit 4 designed to transmit the information about recognized parking-space qualities and/or object classifications together with location and time information, e.g., via a wireless data link to an external data server, and/or to receive data about parking spaces from an external data server.

What is claimed is:

1. A method comprising:
sensing objects in an environment of the vehicle using at least one sensor of the vehicle, the driving-environment sensor transmitting signals that the objects reflects as echo signals received by the at least one sensor;
identifying parking-space-delimiting objects of the sensed objects by evaluating the echo signals, wherein the evaluating includes classifying the parking-space-delimiting objects through characteristic structures of the echo signals;
based on the classification of the parking-space-delimiting objects, determining a quality of a parking space defined by the parking-space-delimiting objects; and
recognizing the parking space as a possible parking space for the vehicle responsive to the quality of the parking space being at least a threshold value,
wherein the characteristic structures of the echo signals include hyperbolic structures obtained by plotting a position of the at least one sensor at a time of the sensing relative to an object distance determined from a propagation time of the echo signals, wherein the hyperbolic structures are used to classify the parking-space-delimiting objects.

2. The method of claim 1, wherein the parking space is defined by a first one of the parking-space-delimiting objects, a second one of the parking-space-delimiting objects, and a lateral parking-space delimitation.

3. The method of claim 2, wherein the first parking-space-delimiting object and the second parking-space-delimiting object are each classified as belonging to one of the following object classes: (a) a vehicle parked parallel to a direction of traffic, (b) a vehicle parked transversely to the direction of traffic, (c) a short object, and (d) no object.

4. The method of claim 2, wherein the lateral parking-space delimitation is classified as belonging to one of the following object classes: (a) a low lateral parking-space delimitation, (b) a high lateral parking-space delimitation, and (c) no lateral parking-space delimitation present.

5. The method of claim 2, wherein each different possible combination of the respective classes of the first parking-space-delimiting object, the second parking-space-delimiting object, and the lateral parking-space delimitation is assigned a respective one of a plurality of quality measures, and the determining of the quality includes assigning to the parking space one of the plurality of quality measures depending on which of the combinations is identified as being associated with the parking space.

6. The method of claim 1, wherein the threshold value is set by a driver of the vehicle.

7. The method of claim 1, further comprising transmitting information about any one or more of (a) the parking space, (b) the sensed objects, (c) the classifications, and (d) the determined quality to a central data store that is configured to store the transmitted information in a manner by which the information is retrievable by other road users.

8. The method of claim 1, wherein the transmitted signals are ultrasonic signals.

9. A parking-assist system of a vehicle, the system comprising:
at least one sensor; and
a processor;
wherein the processor is configured to:
sense objects in an environment of the vehicle by using the at least one sensor to transmit signals that the objects reflects as echo signals received by the at least one sensor;
identify parking-space-delimiting objects of the sensed objects by evaluating the echo signals, wherein the evaluation includes classifying the parking-space-delimiting objects through characteristic structures of the echo signals;
based on the classification of the parking-space-delimiting objects, determine a quality of a parking space defined by the parking-space-delimiting objects; and
recognize the parking space as a possible parking space for the vehicle responsive to the quality of the parking space being at least a threshold value,
wherein the characteristic structures of the echo signals include hyperbolic structures obtained by plotting a position of the at least one sensor at a time of the sensing relative to an object distance determined from a propagation time of the echo signals, wherein the hyperbolic structures are used to classify the parking-space-delimiting objects.

* * * * *